United States Patent [19]

Gibbons

[11] 4,202,372
[45] May 13, 1980

[54] ARTICULATED FLUID CONDUIT WITH AUXILIARY SUPPORT

[75] Inventor: Harold M. Gibbons, Long Beach, Calif.

[73] Assignee: FMC Corporation, San Jose, Calif.

[21] Appl. No.: 746,454

[22] Filed: Dec. 1, 1976

[51] Int. Cl.² .......................... B67D 5/04; F16L 27/02
[52] U.S. Cl. .................................. 137/615; 248/277; 141/387
[58] Field of Search .................. 137/615; 248/49, 277; 141/279, 284, 387, 388

[56] References Cited

U.S. PATENT DOCUMENTS

| | | | |
|---|---|---|---|
| 248,985 | 11/1891 | Behrns et al. | 198/519 |
| 2,648,201 | 8/1953 | Marancik et al. | 137/615 X |
| 3,359,741 | 12/1967 | Nelson | 141/279 |
| 3,372,715 | 3/1968 | Ashton | 137/615 X |
| 3,399,909 | 9/1968 | Ambrose | 137/615 X |
| 3,661,170 | 5/1972 | Mitchell | 137/351 |
| 3,705,610 | 12/1972 | Baudras | 137/615 X |
| 3,722,223 | 3/1973 | Gratz | 141/387 |
| 3,774,253 | 11/1973 | Lecomte | 9/8 P |
| 3,834,432 | 9/1974 | Lilly, Jr. et al. | 141/388 |
| 3,926,231 | 12/1975 | Madden et al. | 137/615 |
| 4,092,996 | 6/1978 | Kock | 137/615 |

FOREIGN PATENT DOCUMENTS 745845 11/1966 Canada .
389259 11/1976 Sweden .

Primary Examiner—Martin P. Schwadron
Assistant Examiner—A. Michael Chambers
Attorney, Agent, or Firm—J. F. Verhoeven

[57] ABSTRACT

An expandable and retractable fluid conduit is disclosed for conveying fluid between a fixed point and a movable point. A plurality of rigid pipe sections are pivotally connected in end-to-end relation by swivel joints to form an articulated fluid conveying pipe. A plurality of rigid support sections are pivotally connected in end-to-end relation to form an articulated support member. The articulated pipe member and the articulated support member criss-cross, and are pivotally connected at their intersections, to form a lazy tong configuration. Universal swivel joints are provided at each end of the conduit, and means is provided to render each pipe section and each support section buoyant in underwater installations. In another embodiment of the invention, two articulated fluid conveying pipes criss-cross for pivotal connection at their intersections.

8 Claims, 6 Drawing Figures

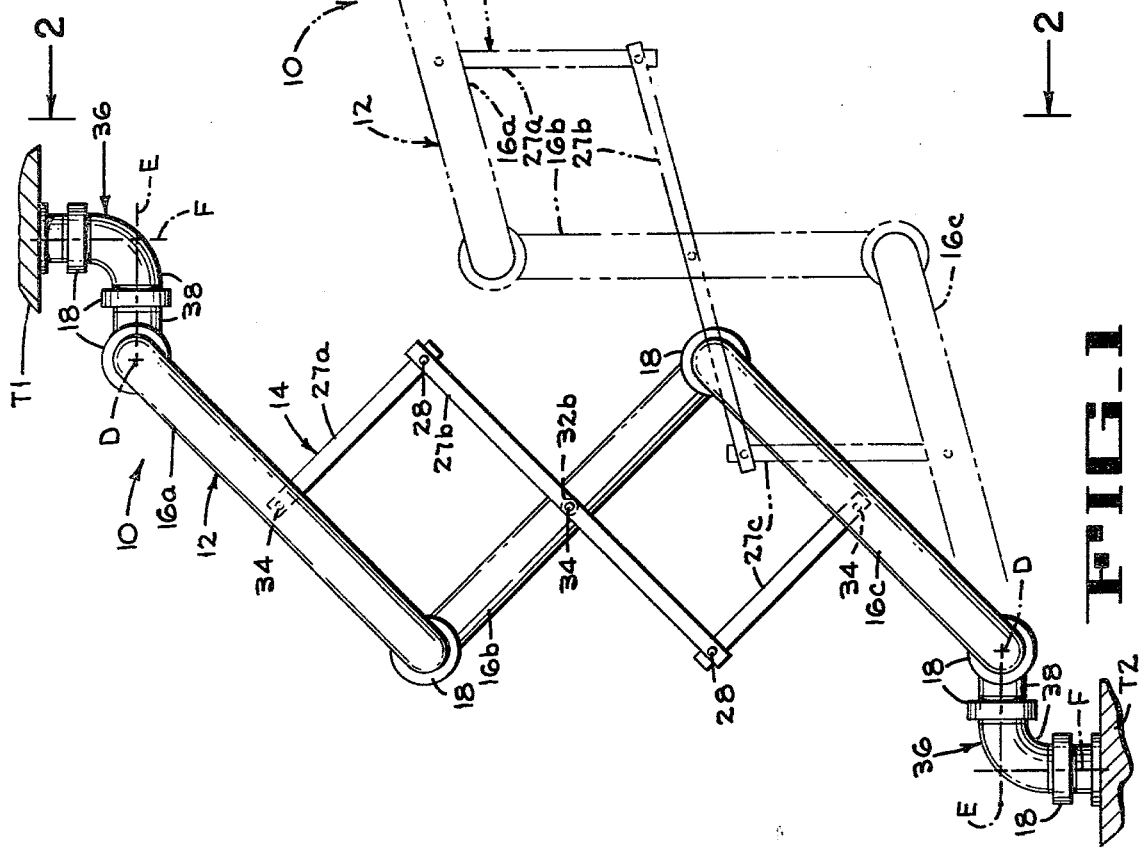
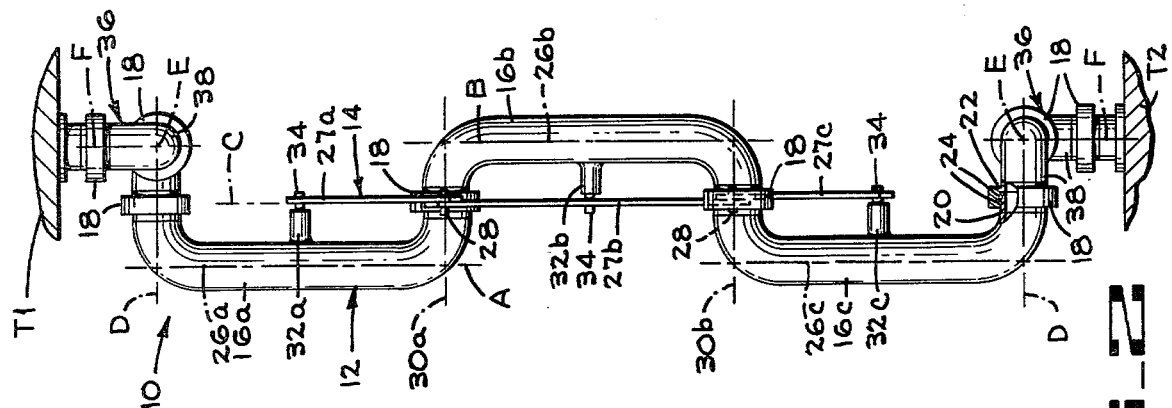

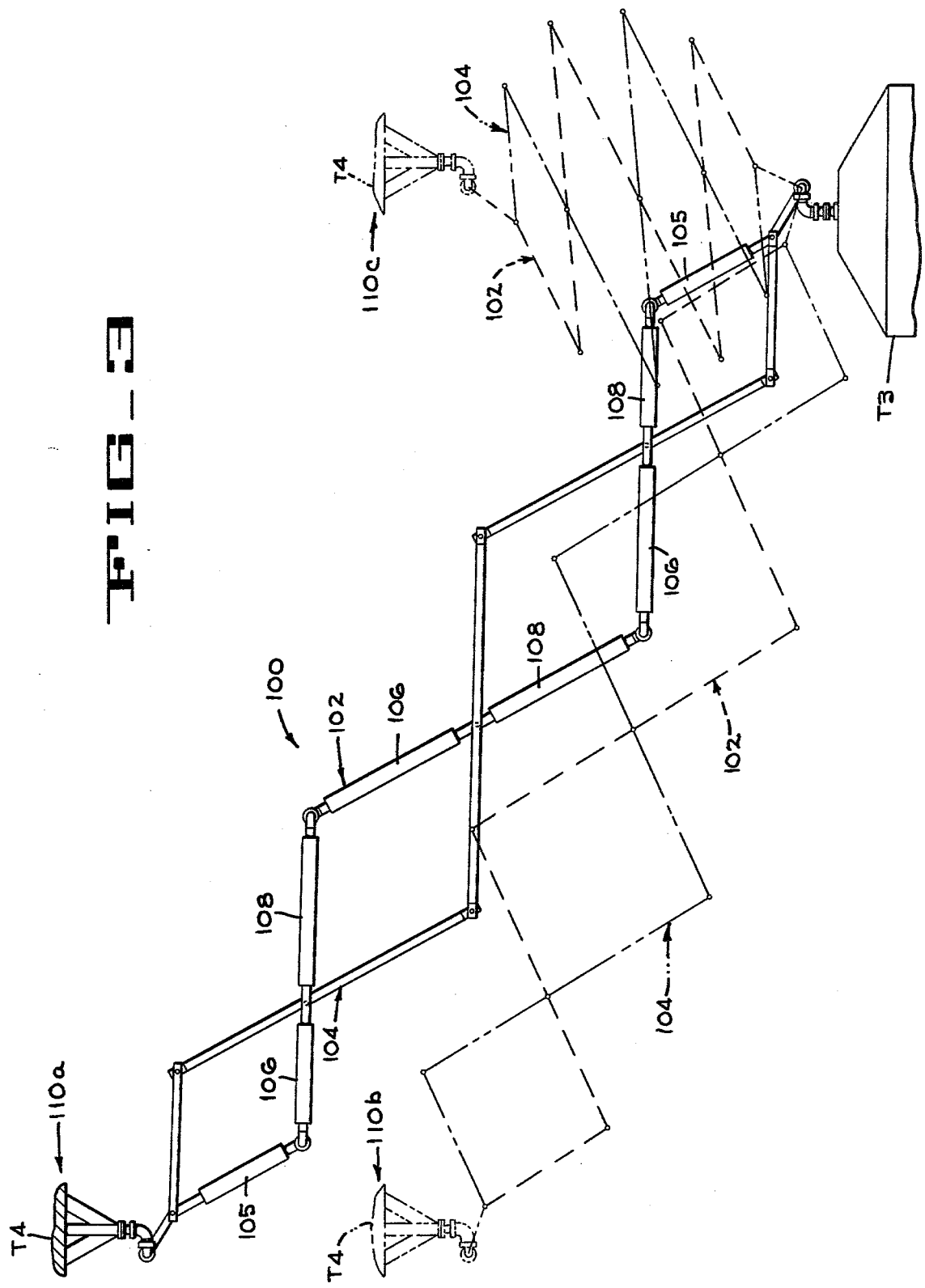

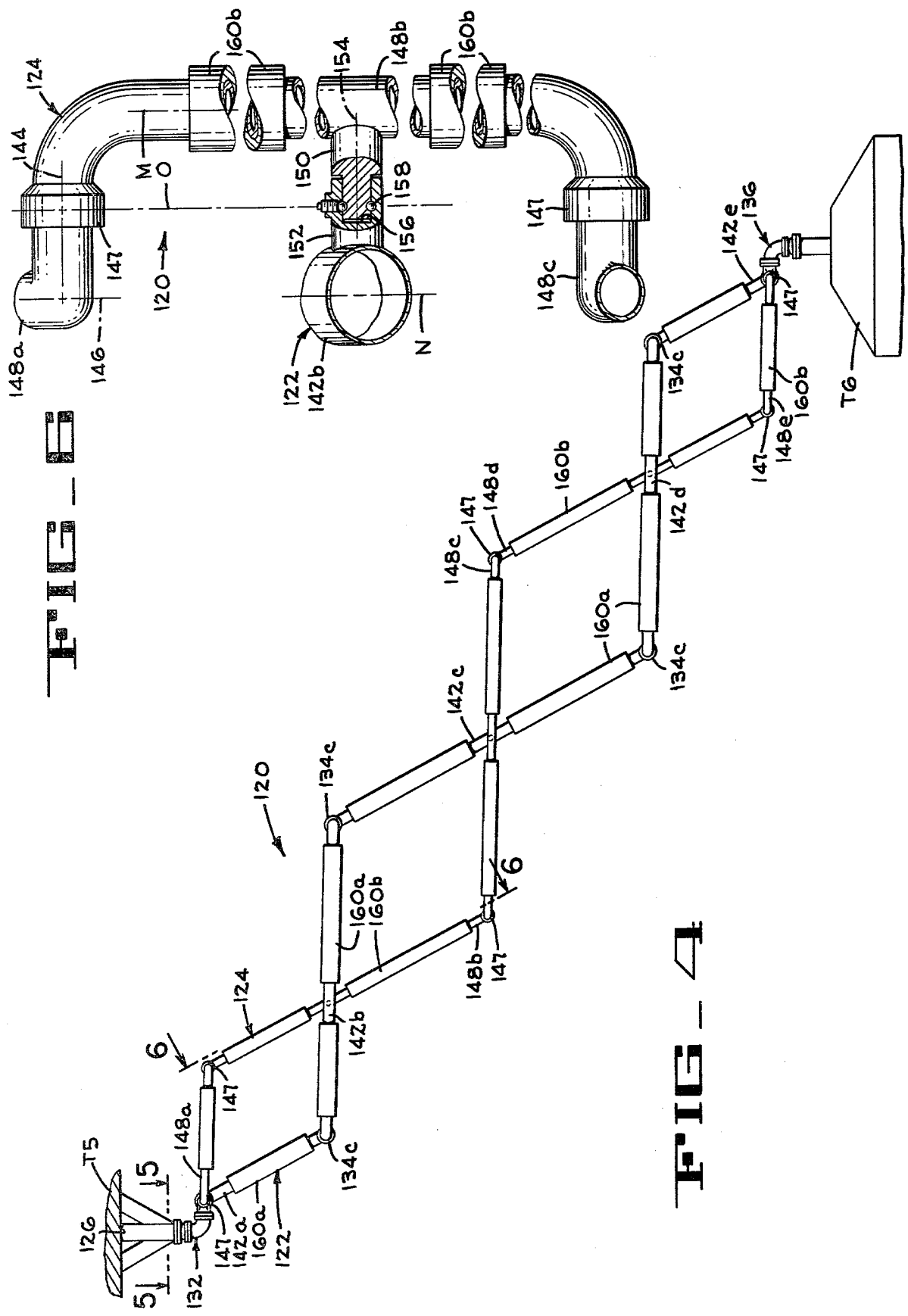

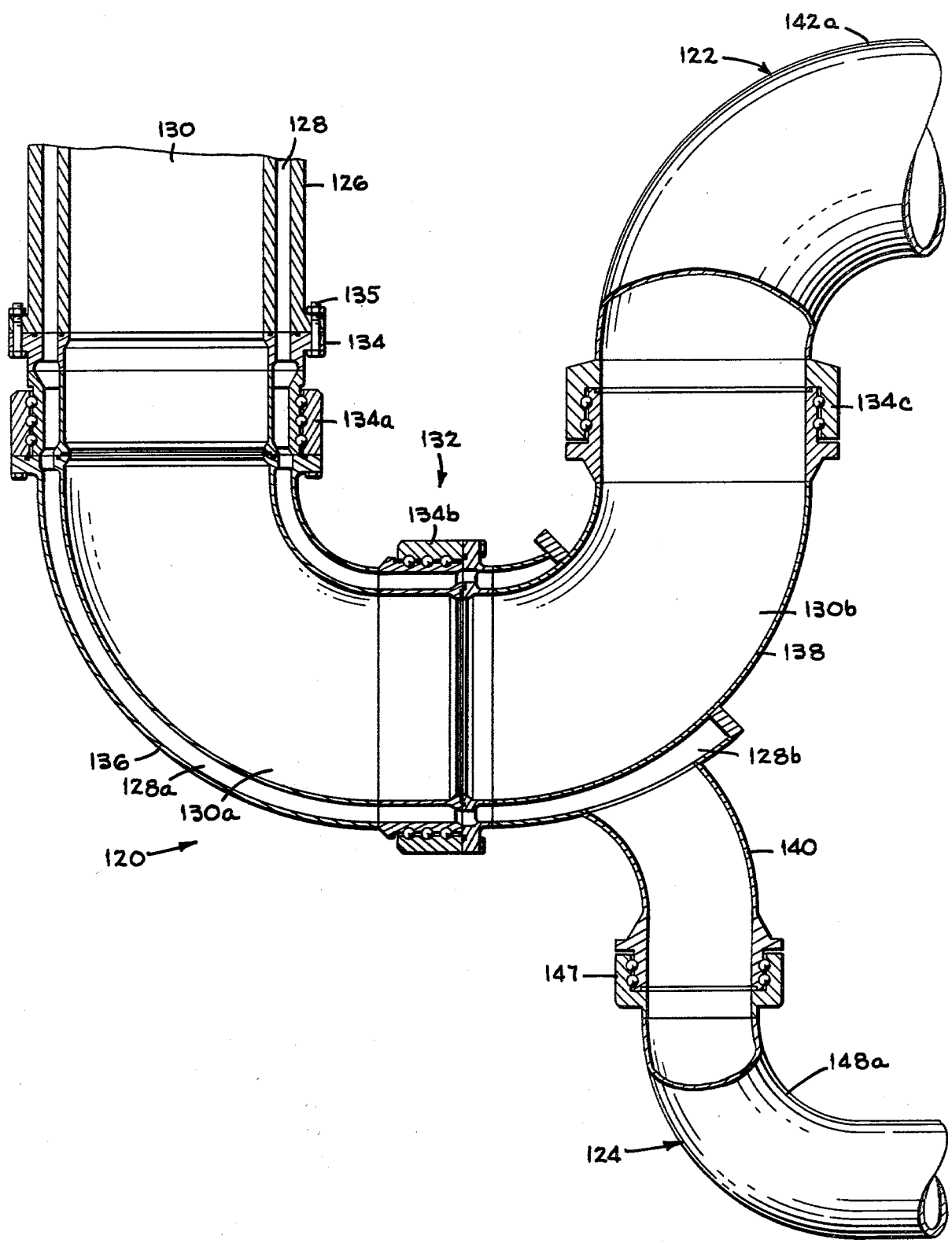

ARTICULATED FLUID CONDUIT WITH AUXILIARY SUPPORT

BACKGROUND OF THE INVENTION

1. Field of the Invention

The present invention relates to fluid conveying and, more particularly, to conveying fluid betwen a fixed and a movable point or any two relatively movable points.

2. Description of the Prior Art

Flexible hose made of rubber or some other deformable material is commonly used to convey fluid between points which are not rigidly fixed with respect to each other. In some instances, however, a rubber hose is not durable enough to withstand the abuse or environment to which the fluid conduit is subjected in a particular application. In those applications where conditions are not suitable for a flexible hose, it is known to utilize an articulated pipe to convey fluid, as shown, for example, in the United States patent to Marancik et al U.S. Pat. No. 2,648,201. The articulated pipe can expand and contract to accommodate the varying distances between fixed and movable points, or terminals.

One of the problems with the use of an articulated pipe for fluid conveyance between relatively movable points is that during contraction the pipe will not always fold up in a predictable manner. For example, in a typical installation where the articulated pipe is used to convey fluid, such as oil, between a fixed terminal on the ocean bed, and a movable terminal such as a ship, the articulated pipe, as it contracts due to movement of the ship closer to the fixed terminal, will be subjected to the forces of the sea and can easily twist and turn into an unpredictable and damaging configuration.

SUMMARY OF THE INVENTION

In order to control the expansion and contraction of an articulated pipe, I have provided an auxiliary articulated support member for control of the articulated pipe. The pipe is made up of a plurality of rigid fluid conveying pipe sections pivotally connected (by fluid conducting swivels) in end-to-end relation, and the support is made up of rigid support sections pivotally connected in end-to-end relation. The articulated fluid conveying pipe and the articulated support member are joined together in criss-cross fashion, with the sections of the support member pivotally connected, respectively, to the sections of the articulated pipe. This results in a lazy tong construction with one branch of the lazy tong consisting of the articulated, fluid conveying pipe and the other branch consisting of the articulated auxiliary support member. Alternatively, I use two articulated fluid conveying pipes which are pivotally joined together in criss-cross fashion to form a lazy tong configuration. In this embodiment of the invention, each articulated fluid conveying pipe acts as the support member for the other fluid conveying pipe.

Preferably, universal joints are connected at each end of the articulated pipe for connection to terminals. I also prefer, in an underwater installation, to render not only each section of the articulated pipe buoyant (as is shown, for example, in the United States patent to Bily U.S. Pat. No. 3,452,787), but also each section of the articulated support member (or the second articulated pipe), to reduce the load on the swivel joints.

It is therefore one object of the present invention to provide an improved expandable and contractable fluid conduit to convey fluid over a variable span between relatively movable points.

It is another object of the present invention to provide an expandable and contractable fluid conveying articulated pipe which will fold on contraction in a predetermined manner.

It is yet another object of the present invention to provide a uniformly foldable articulated fluid conveying pipe which has buoyancy to reduce the load on the articulated joints.

It is still another object of the present invention to provide a double fluid conveying pipe which is foldable in a predetermined manner.

BRIEF DESCRIPTION OF THE DRAWINGS

FIG. 1 is a view in elevation showing a fluid conduit constructed in accordance with the present invention.

FIG. 2 is a view taken on the line 2—2 of FIG. 1.

FIG. 3 is a view in elevation of another embodiment of the present invention.

FIG. 4 is a view in elevation of another embodiment of the present invention.

FIG. 5 is a view taken on the line 5—5 of FIG. 4.

FIG. 6 is a view taken on the line 6—6 of FIG. 4.

DESCRIPTION OF THE PREFERRED EMBODIMENTS

There is shown in FIGS. 1 and 2 a fluid conduit 10 constructed in accordance with the present invention. The conduit 10 has a pantograph, or lazy tong, configuration consisting of two criss-crossing branches 12 and 14, and extends between two relatively movable terminals T1 and T2, one of which may be fixed and the other movable, or both of which may be movable.

The branch 12 is made up of rigid sections 16a, 16b and 16c of fluid conducting pipe connected together in end-to-end relation by fluid conducting swivel joints 18. The swivel joints 18 are conventional and may, for example, consist of an end 20 of one pipe received in an end 22 of an adjacent pipe (FIG. 2), for rotation relative thereto, as by means of balls 24. Each pipe section has a central longitudinal axis (26a, 26b, 26c, respectively) and each swivel 18 has a central axis of rotation 30a and 30b. As shown best in FIG. 2, the pipe sections are bent through 90° at each end so that the swivel axes extend normal to the longitudinal pipe axes (in any position of the pipe axes). Because of the 90° bend in each pipe at each swivel joint, every other pipe lies in one plane (A) and alternate pipes lie in a plane B spaced from plane A. The swivels 18 lie in an intermediate plane C midway between planes A and B.

The branch 14 is made up of sections 27a, 27b and 27c of flat rigid struts which are pivotally connected together in end-to-end relation as by rivets 28. Each pipe section has a boss (32a, 32b and 32c, respectively) which extends from one side of the section, midway between the opposite ends of the section, and terminates at approximately plane C.

The branch 12, which defines an articulated fluid conducting pipe, is joined to the branch 14, which defines an articulated support member. As shown best in FIG. 1, the two branches are joined in a criss-cross manner, with each section of the articulated support member pivotally connected to a section of the articulated pipe, at the intersections of the two branches, to form a lazy tong. The upper end of the upper rigid strut 27a is pivotally connected, by cap screw 34, to boss 32a;

the midpoint of intermediate strut 27b is pivotally connected by a cap screw 34 to boss 32b; and the lower end of lower rigid strut 27c is pivotally connected, by cap screw 34, to boss 32c.

It will be noted that in the illustrated embodiment of the invention shown in FIGS. 1 and 2, the articulated support member 14 lies in the same plane C as the swivels. It is not necessary that these members lie in the same plane, but it is convenient in the embodiment illustrated since the plane C is midway between the two planes A and B in which alternate sections of the articulated pipe lie.

The fluid conduit 10 extends between two relatively movable terminals T1 and T2, which may be any terminals for delivering or receiving fluids, such as liquid or gas. For a universal connection of the fluid conduit 10 to these terminals, a compound swivel joint 36, connected to each end of the conduit, is employed. This swivel joint 36 has three swivels 18 with two intermediate short pipe portions 38, each pipe portion having a 90° bend, to provide swiveling on three mutually perpendicular axes D, E and F.

It will be noted that the fluid conduit of the present invention can be made up of as many conduit sections as desired or required. As the fluid conduit 10 moves from the position shown in solid lines to the position shown in dotted lines, alternate pipe sections 16a and 16c are restrained by the articulated support member to remain parallel to each other. The intermediate pipe section 16b would also be restrained to align parallel to alternate pipe sections if more than three pipe sections are used. The adjacent pipe sections at each swivel joint turn relative to each other in the opposite direction to the pipe sections at the adjacent swivel. In other words, the pipe section connected at one end of any given pipe section swivels in a direction opposite to the pipe section connected at the opposite end of said given pipe section so that the pipe sections will fold in a regular and orderly manner.

FIG. 3 shows an underwater fluid conduit 100 extending from a fixed terminal T3 (which may be a riser anchored to the ocean bed) to a movable terminal T4 (which may be a floating tank). The fluid conduit of FIG. 3, which is also of a lazy tong configuration, has a branch 102 consisting of an articulated fluid conducting pipe and has a branch 104 consisting of an articulated support member. The branch 102 and the branch 104 are joined in a criss-crossing manner with the sections of branch 102 pivotally connected to the sections of branch 104 to define the lazy tong configuration in the same manner as in the embodiment illustrated in FIGS. 1 and 2.

Each pipe section (except the end sections) has two buoyant sheathes 106, 108 (one on each side of the intersection of the two branches 102, 104) to render it buoyant. The end pipe sections have a single sheath 105. The buoyant sheathes may be coaxial tubes surrounding the conduit and sealed thereto in fluid tight relation to define air chambers. Alternatively, the buoyant sheathes may be made of a low density solid or porous material such as wood or cork. In addition, each rigid support member, which in this embodiment of the invention is a hollow member, is stuffed with a buoyant material, and sealed, to render it buoyant. The rigid support members may also be rendered buoyant by sealing them, without the buoyant material therein, to define hermetically sealed air chambers. The buoyancy of the respective sections of the articulated pipe of the fluid conduit diminishes the load on the swivels between the sections. Similarly, the buoyancy of the respective sections of the articulated support member reduces the load at the pivotal connections between the sections and the pivotal connections to the articulated pipe.

In FIG. 3, the movable terminal T4 is shown in three different positions (110a, 110b and 110c). In two of the positions, the longitudinal axes of the individual sections of the articulated pipe are shown in dotted lines and the longitudinal axes of the individual sections of the articulated support member are shown in phantom lines. From these positions shown, it will be noted how the articulated support member restrains the fluid conduit as the conduit contracts in length (that is, as the distance between the terminals diminishes) to insure a regular folding of the articulated pipe, with alternate sections parallel to each other.

There is shown in FIGS. 4, 5 and 6 another fluid conduit 120 constructed in accordance with the present invention. The conduit 120 has a pantograph, or lazy tong, configuration consisting of two criss-crossing branches 122 and 124, and extends between two relatively movable terminals T5 and T6, one of which may be fixed and the other movable, or both of which may be movable.

As shown best in FIG. 5, terminal T5 has a connecting pipe 126 with annular passage 128 and internal passage 130 (which passages are coaxial) to which a coaxial compound swivel joint 132 is connected. Swivel joint 132 has a coupling 134 which is secured by bolts 135 to the end of pipe 126. The swivel joint 132 has three swivels 134a, 134b and 134c with two intermediate short pipe sections 136 and 138, each pipe section having a 90° bend. Section 136 (which, together with pipe 126, is shown 90° out of position in FIG. 5 for clarity) has coaxial passages 128a and 130a forming extensions of passages 128, 130 of pipe 126. Section 138 also has coaxial passages 128b, 130b for a portion of its length. A smaller pipe section 140 is connected to section 138 intermediate its ends for communication with passage 128b therein. The internal passage 130b of section 138 continues to the outer end of pipe section 138. The swivel joint 132 connected to terminal T6 is identical to the swivel joint connected to terminal T5 and need not be further described.

The branch 122, which is connected to swivel pipe section 138 by means of the swivel 134c, is made up of fluid conveying rigid pipe sections 142a, 142b, 142c, 142d and 142e connected together in end-to-end relation by fluid conducting swivels 134c, similar to the swivels 18. As shown best in FIG. 6, the pipe sections are bent through 90° at each end so that the swivel axes 144 extend normal to the longitudinal pipe axes 146 (in any position of the pipe axes). Because of the 90° bend in each pipe at each swivel joint, every other pipe lies in one plane (M) and alternate pipes lie in a plane N spaced from plane M. The swivels lie in an intermediate plane O midway between planes M and N.

The branch 124 which is connected to swivel pipe section 140 by means of a swivel 147 is made up of fluid conveying rigid pipe sections 148a, 148b, 148c, 148d and 148e connected together in end-to-end relation by fluid conducting swivels 147 similar to swivels 18. The pipe sections of branch 124 are of smaller diameter than the sections of branch 122, but in other respects are similar. Every other section of branch 124 lies in the plane N and alternate sections lie in the plane M. Each pipe section (except the end sections which are shorter than other sections) in both branches has a boss 150, 152 midway between the ends of the section. The bosses of each branch extend toward the other branch and are pivotally joined in plane O for relative rotation about transverse axis 154 which is normal to plane O. The bosses 150 extending from branch 124 are received in bores 156 in bosses 152 extending from branch 122, and retained therein for relative anti-friction rotation by balls 158.

Buoyant jackets 160a and 160b are mounted, on the individual sections of each of the branches 122, 124, on each side of the bosses 150, 152, to take the load off the swivels.

Thus, it will be seen that, in the embodiment of FIGS. 4, 5 and 6, two articulated fluid conveying branches are provided, pivotally connected to each other in a lazy tong configuration. The two branches can simultaneously convey different fluids (or the same fluids if desired) and, at the same time, each branch supports and confines the other for orderly expansion and contraction in a predetermined manner, when one or more of the terminals moves.

Although the best mode contemplated for carrying out the present invention has been herein shown and described, it will be apparent that modification and variation may be made without departing from what is regarded to be the subject matter of the invention.

What is claimed is:

1. An expandable and contractable fluid conduit assembly for extension between relatively movable terminals comprising in combination: a first branch of a lazy tong including a plurality of fluid-conducting rigid pipe sections arrayed in end-to-end relation, a plurality of annular fluid-conducting swivel joints having rigid relatively rotatable portions respectively connected between said pipe sections to define an articulated pipe operable to convey fluid from one end to the other, a second branch of a lazy tong including a plurality of rigid elongated support sections, means pivotally connecting said support sections in end-to-end relation to define an articulated support member, said two branches criss-crossing at intersections of each pipe section and support section of the branches, means pivotally connecting said respective branch sections at said intersections, and a three-axis swivel connected to each end of the fluid-conducting pipe for respective connection to the flow terminals, whereby said assembly may partake of universal movement about the three axes of each swivel, and expansion and contraction, upon occurrence of relative movement between said terminals.

2. The fluid conduit assembly of claim 1 wherein said second branch support sections are a plurality of fluid-conducting rigid pipe sections arrayed in end-to-end relation, and said pivotal connecting means are a plurality of annular fluid-conducting swivel joints having rigid relatively rotatable portions respectively connected between said second branch pipe sections, thereby to define an articulated pipe for conveying fluid from one end to the other, and means connecting said three-axis swivels to each end of said second branch pipe.

3. The fluid conduit assembly of claim 2 wherein said three-axis swivels have means therein for separately conducting fluids therethrough to each of said branches.

4. The fluid conduit assembly of claim 1 wherein buoyant means is provided on some sections of said branches to relieve the vertical load on said swivel joints, pivotal connecting means, and said three-axis swivels in undersea use.

5. The fluid conduit assembly of claim 4 wherein said buoyant means is a sheath-like member about a said pipe section.

6. The fluid conduit assembly of claim 1 wherein said pipe section swivel joints and said intersection pivotal connection means lie in substantially the same plane.

7. The fluid conduit assembly of claim 1 wherein said rigid pipe sections include elongated center portions and short end portions disposed at right angles to said center portions connected to said swivel joints.

8. The fluid conduit assembly of claim 1 wherein said pipe sections have laterally extending bosses at said intersections forming part of said pivotally connecting means.

* * * * *